United States Patent [19]

Rearigh

[11] Patent Number: 4,899,038

[45] Date of Patent: Feb. 6, 1990

[54] IDENTIFICATION CARD

[76] Inventor: Alfred R. Rearigh, 550 Finnin Rd., New Kensington, Pa. 15068

[21] Appl. No.: 127,687

[22] Filed: Dec. 2, 1987

[51] Int. Cl.⁴ ............................................. G06K 19/06
[52] U.S. Cl. ..................... 235/493; 235/450; 235/487
[58] Field of Search ................. 235/382.5, 450, 487, 235/493

[56] References Cited

U.S. PATENT DOCUMENTS 3,399,473  9/1968  Jaffe .................................. 235/487 X
3,705,294  12/1972  Kuehnle et al. ...................... 235/487
4,801,790  1/1989  Solo ..................................... 235/487

Primary Examiner—David L. Trafton

[57] ABSTRACT

An identification system including a card bearing a code, in combination with a means operable by a holder of the card for hiding a selected portion of the code for creating a subcode associated with the proper holder.

4 Claims, 1 Drawing Sheet

IDENTIFICATION CARD

Summary of the Invention

An identification system including a card bearing a code, in combination with a means operable by a holder of the card for hiding a selected portion of the code for creating a subcode associated with the proper holder.

Detailed Description

In present day identification cards, the information stamped on the card is insufficient for providing a great amount of protection against the usage by others when the card is lost, stolen or duplicated. In the improved version according to the present invention, the card holder is protected in a much greater way. Thus, a principal object of this invention is to afford a much greater safety margin against the illegal use of the card. This is done according to the present invention by providing the card with a code containing extraneous alphanumeric character(s), and combining the card with a means operable by the holder for hiding the extraneous characters for creating a subcode which identifies the proper holder of the card.

Figure 1:
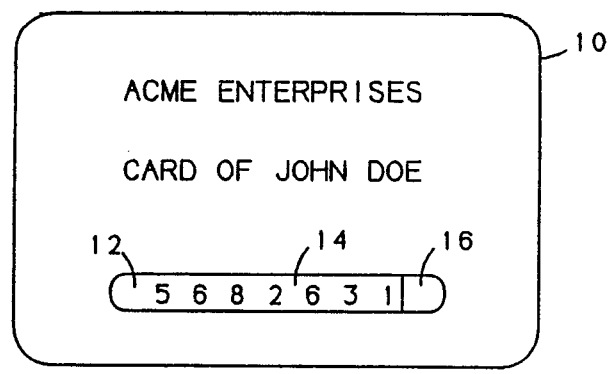
FIGS. 1 and 2 are plan views of an identification card according to the invention.

The drawing shows a preferred embodiment of the invention. In FIG. 1, a charge card 10 issued by Acme Enterprises to holder John Doe bears a code 12, 5682631, on track 14. Mr. Doe is actually associated with the subcode 56 2631, and he must place the card in a valid condition bearing that subcode by moving slide 16 along the track until the slide hides the code number 8.

Figure 3:
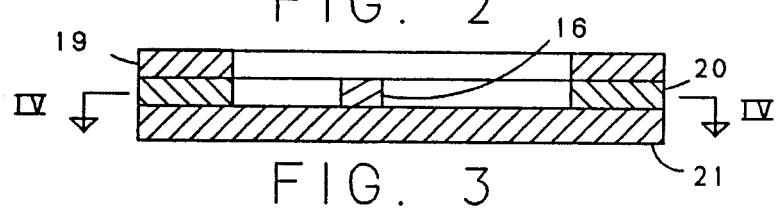
FIG. 3 is a section taken along the cutting plane III—III of FIG. 2.

As shown in FIG. 3, card 10 is constructed of three layers, top layer 19, middle layer 20, and base layer 21.

Figure 2:
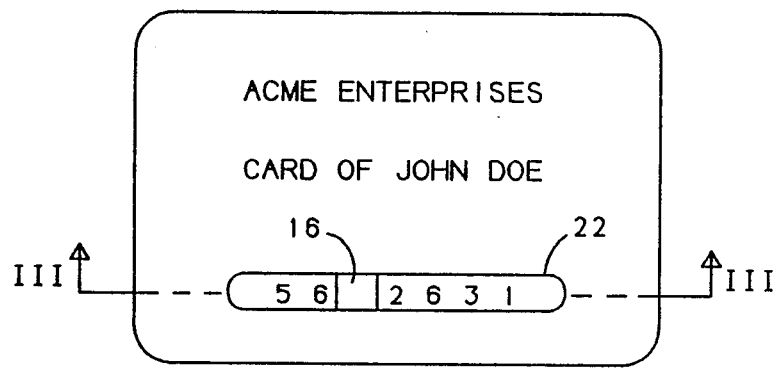
Figure 4:
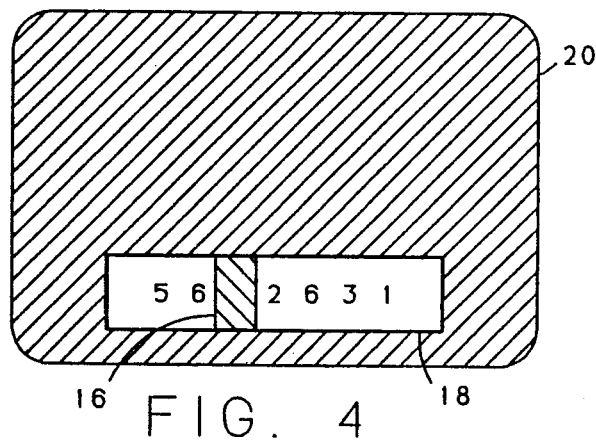
FIG. 4 is a section taken along the cutting plane IV—IV of FIG. 3.

Slide 16 is slidably held in track 14 by a pocket created by making window 18 in middle layer 20 bigger in the up-down direction in the plane of FIGS. 1, 2, and 4 than window 22. The code characters may be raised (not shown) from the face of the base layer, such that they will give a uniform impression of the code onto a paper form when run through a machine for pressing the card and a form together. Slide 16 prevents the character 8 from showing in the impression.

In use, the card holder must first operate the slide, for instance by fingernail pressure, such that the card shows the proper subcode assigned to him by the issuer.

The card thus presented for credit may be checked, for example by transmission of the subcode by a tone-emitting telephone to a computer containing the appropriate data base. The computer may respond by having a speech synthesizer spell back the holder's name that should appear on the card. If the wrong name comes back, the card is not returned to the person who presented it.

When the card is not being used, for example when it is being carried in the holder's wallet, the holder will want to have the code in a scrambled condition. This is done by moving the slide such that it hides some number other than the number 8, for example the number 3, or by moving it completely off the code, as shown in FIG. 1.

According to a modification of the invention, the code is carried in a magnetic strip running parallel to the visually observable code. For instance, base layer 21 is formed of magnetic strip beneath track 14 and carries a digital encodement of code 12. The digital coding of each alphanumeric member of the code 12 is situated in the magnetic strip exactly beneath its visual equal in the code on track 14. In this modification, slide 16 contains a soft iron core, to capture the magnetic lines of force of the digital encodement beneath it, so that, when slide 16 has been moved to cover the number 8, a reading of the magnetic strip reads the correct subcode 56 2631. In this way, the identification system of the present invention can be processed both in a visual mode and in an automatic, computer-oriented mode.

I claim as my invention:

1. An identification system comprising a card bearing a code, in combination with a means operable by a holder of the card for hiding a selected portion of the code for creating a subcode associated with the proper holder, said means comprising a slide movable along a track on the card, the track bearing the code.

2. An identification system comprising a card bearing a code, in combination with a means operable by a holder of the card for hiding a selected portion of the code for creating a subcode associated with the proper holder, the code being magnetically encoded.

3. An identification system comprising a card bearing a code, in combination with a means operable by a holder of the card for hiding a selected portion of the code for creating a subcode associated with the proper holder, said means comprising a slide movable along a track on the card, the track bearing the code, the code being magnetically encoded, the slide containing means for obscuring the magnetic encodement of the selected portion of the code.

4. An identification system as claimed in claim 3, the slide containing a soft iron core.

* * * * *